UNITED STATES PATENT OFFICE.

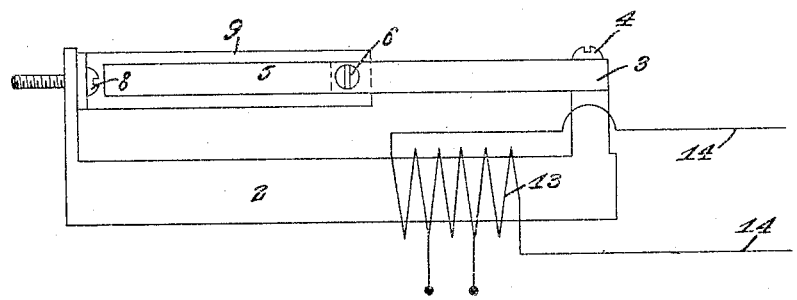
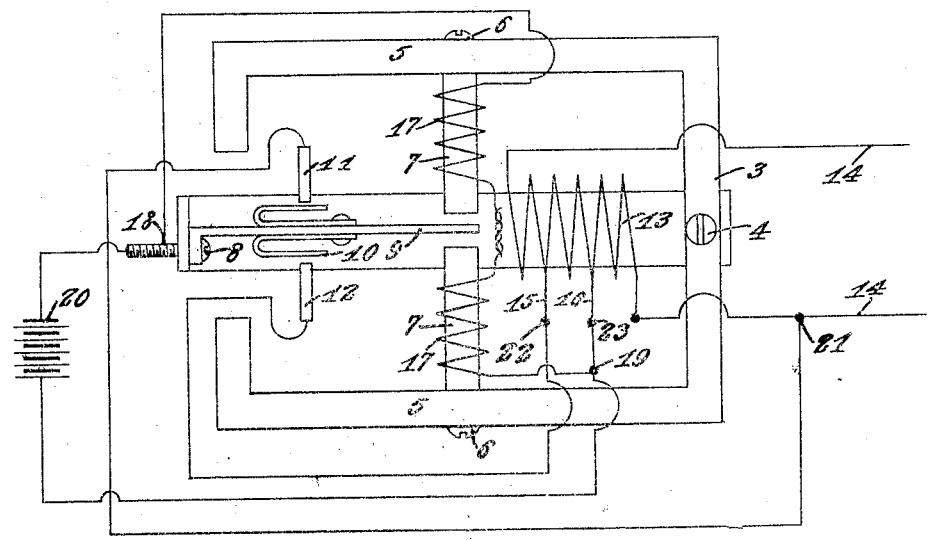

CHRIS L. VOLZ, OF CLEVELAND, OHIO.

ELECTRICAL APPARATUS.

1,312,064.     Specification of Letters Patent.     Patented Aug. 5, 1919.

Application filed February 15, 1919. Serial No. 277,266.

*To all whom it may concern:*

Be it known that I, CHRIS L. VOLZ, a citizen of the United States, residing at Cleveland, in the county of Cuyahoga and State of Ohio, have invented a new and useful Electrical Apparatus, of which the following is a specification.

This invention relates to improvements in electrical apparatus, and more particularly to improvements in alternating current rectifiers, the object of the invention being to provide a novel combination and arrangement of the parts which form the electric and magnetic circuits whereby to commutate the alternating current reversal and impart an approximately continuous exciting current to the electromagnet coils employed, thereby to keep an armature in continuous motion.

In the drawing accompanying and forming part of this specification,

Figure 1 is a side view of a device embodying my improved apparatus; and

Fig. 2 is a plan view thereof.

The same characters of reference designate the same parts in the figures of the drawing.

In the embodiment of the invention herein illustrated, 2 designates an iron core of approximately U-shape, as shown in Fig. 1, on one of the upstanding arms of which is mounted a second iron core 3, which is of C-shape and is secured to said upstanding arm in any suitable manner, as for instance by a screw 4. At about midway of the length of the arms 5 of the core 3 are secured by means of screws 6 a pair of cores or pole pieces 7 which extend toward each other within the C-shaped core 3.

Upon the upstanding arm of the core 2 opposite to that on which is supported the core 3, is secured, as at 8, a vibratory armature 9, which is constructed after the manner of a spark coil vibrator and which extends within the core 3 to a point about midway between the ends of the pole pieces 7. This armature 9 is provided on each side thereof about midway of its length with a U-shaped member 10 for contact with brushes 11, 12, which may be supported in any suitable manner in proximity to such U-shaped members.

Around the main or body portion of the core 2 is wound a coil 13, which is connected by leads 14 with an alternating current supply (not shown), and by means of which coil the iron core 2 is magnetized. The coil 13 is divided into sections having tap leads 15, 16, as shown in Fig. 2.

Electro-magnet coils 17 are wound around the pole pieces or cores 7, these coils being connected across the battery and vibrator circuit at 18 and 19 respectively and are alternately excited by the battery and rectified current. One line of the battery 20 is connected to a portion of the alternating current supply coil at 23, while the other line of the battery is connected to the vibrator by means of the binding screw 8. The brush 11 is connected to the alternating current supply line at 21, and the brush 12 is connected to a portion of the alternating current supply coil at 22.

In the operation of the rectifier, the vibrator is dependent for its oscillation on the interaction of the alternating magnetism in the armature 9 and the direct current field in the poles 7. As a result of this combined direct and alternating field the armature will be alternately attracted by the poles 7. The direct current coils 17 receive current from the battery when the wave electromotive force of the rectifier is less than that of the battery voltage, but at the instant the wave electromotive force reaches a value greater than the battery voltage the electromagnet coils 17 receive current from the rectifier in the same direction. It will thus be seen that the improved combination provides an exciting current through the coils 17 which is substantially continuous, thereby keeping the armature 9 in constant motion.

While I have described in detail the specific embodiment of my invention herein illustrated, it is of course understood that I do not limit myself to the identical features of construction shown, since many mechanical changes may be made without departing from the spirit and scope of my invention.

I claim as my invention:

1. An alternating current rectifier, comprising, in combination with a battery and a source of supply, a core, a core secured to said first core, a pair of poles carried by said second core and extending toward each other, a vibratory armature secured to said first core and extending between the poles carried by said second core, a contact brush supported adjacent to each side of said armature and adapted to make contact therewith, a coil wound upon said first core and connected to said source of supply, a pair of electromagnet coils wound on said poles, and connections between said last coils and the battery and the source of supply whereby a substantially continuous exciting current is supplied to said coils.

2. An alternating current rectifier, comprising, in combination with a battery and a source of supply, a U-shaped core, a core secured to an upstanding leg of said U-shaped core, said second core carrying a pair of poles extending toward each other, a vibratory armature secured to the opposite upstanding leg of said U-shaped core and extending between said poles, a contact brush supported adjacent to each side of said armature, a member carried by said armature at each side thereof and adapted to make contact with said brushes, a coil wound upon said U-shaped core and connected to said source of supply, a pair of electromagnet coils wound on said poles, and connections between said last coils and the battery and the source of supply whereby a substantially continuous exciting current is supplied to said coils.

3. An alternating current rectifier, comprising, in combination with a battery and a source of supply, a core, a C-shaped core secured to said first core, said C-shaped core carrying a pair of poles extending toward each other, a vibratory armature secured to the first-mentioned core and extending between the legs of said C-shaped core and into position to be attracted by said poles, a contact brush supported adjacent to each side of said armature, a U-shaped member carried by said armature at each side thereof and adapted to make contact with said brushes, a coil wound upon said first core and connected to said source of supply, said coil being divided into sections having tap leads, a pair of electromagnet coils wound upon said poles, connections between one of said pair of coils and the battery and between the other of said pair of coils and one of the tap leads of said first-mentioned coil, and connections between the battery and the other of said tap leads and also between the battery and said vibratory armature, whereby a substantially continuous exciting current is supplied to said pair of coils.

In testimony that I claim the foregoing as my own, I have hereto affixed my signature in the presence of two witnesses.

CHRIS L. VOLZ.

Witnesses:
H. M. EICHHORN,
L. A. ZERBE.